June 7, 1966  H. E. THOMASON  3,254,643
SOLAR HEAT APPARATUS
Filed July 29, 1960
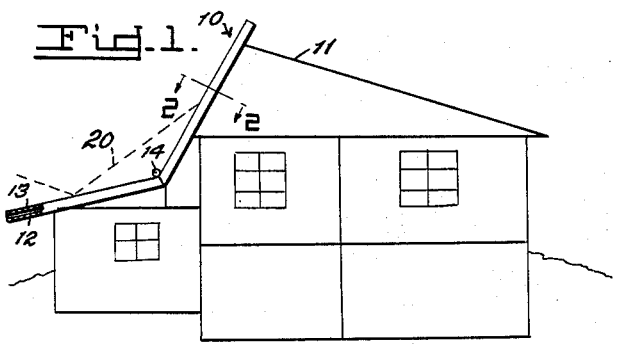
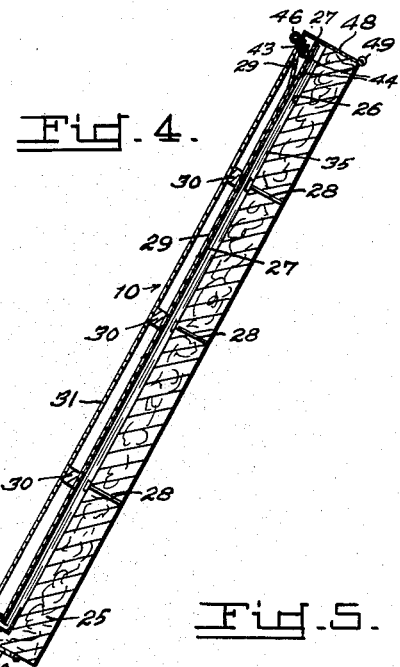
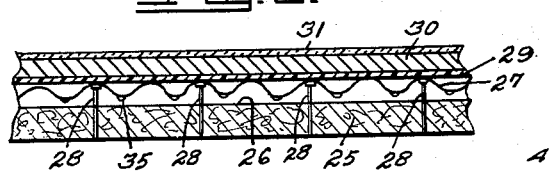
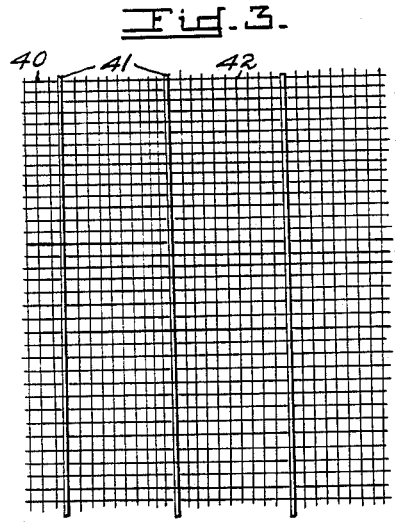
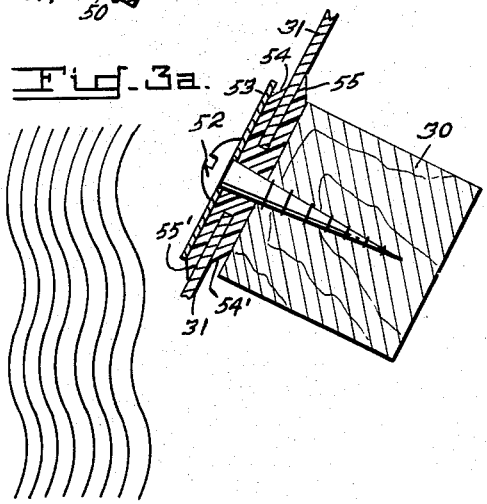
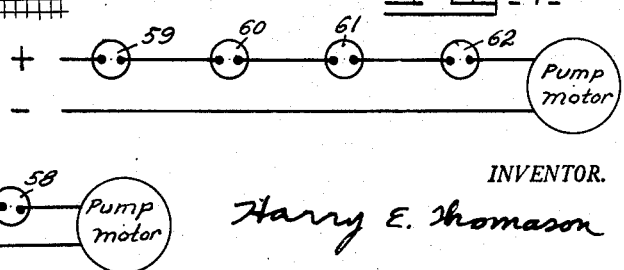
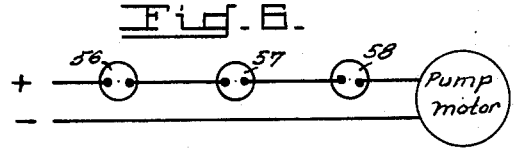
INVENTOR.
Harry E. Thomason

United States Patent Office 3,254,643
Patented June 7, 1966

3,254,643
SOLAR HEAT APPARATUS
Harry E. Thomason, 7354 Walker Mill Road SE.,
Washington, D.C.
Filed July 29, 1960, Ser. No. 46,213
8 Claims. (Cl. 126—271)

The present invention relates to solar heat collectors for converting incoming solar rays into heat and for trapping such heat for various purposes and uses. Although not limited to such uses, the present invention is usable to heat gases or liquids, which in turn can be used for space heating, domestic water heating, heating of swimming pools, heating of greenhouses, and for many other purposes.

Referring more particularly to the drawing:

FIG. 1 is an end elevation of a building showing an example of a construction embodying the present invention.

FIG. 2 is a view along line 2—2 of FIG. 1 illustrating one form of heat collector.

FIG. 3 is a plan view of a portion of another form of the heat collector.

FIG. 3a is a plan view of another modification.

FIG. 4 is a detailed side view of the collector of FIG. 1 showing other details of the invention.

FIG. 5 is a view through a spacer member illustrating a preferred construction for securing the upper transparency thereto.

FIG. 6 is a diagram of a circuit for operating the pump motor to circulate a fluid through the collector.

FIG. 7 is a diagram of a circuit for operating the pump motor to circulate liquid over the heat dissipator for summertime use.

As an example of how and where the present invention may be used, it has been illustrated in FIG. 1 in conjunction with a building such as a split level home, or a home with a garage attached thereto. The solar heat trap is illustrated at 10 with a roof section 11.

The section of roof at 12 has a reflective cover section at 13 which is pivoted at 14. During the colder months the reflective cover is in its lowermost position as illustrated. Sunshine falling on this area is reflected toward the heat collector by the upper surface of reflector 13 as illustrated at 20. Thus, the intensity of available solar energy on collector 10 is greatly increased by use of relatively inexpensive cover 13, and more energy is available per unit of area of heat collector.

In some sections of the world severe hailstorms are a menace to a transparency such as glass which may be used on the heat collector. Also, the summertime heat build-up in a heat collector is damaging to the materials and shortens the life of the materials. In addition, even though the collector insulation is good, it is not perfect and some of the heat gets through into the attic or other portions of the home. Reflective cover 13 is adapted to be positioned over collector 10 when desired, such as by swinging it about pivot 14. Said cover may be used during hot weather when hailstorms occur, or may be used during hurricanes or during blizzard conditions in the event that sheer weight of snow and ice would tend to damage the collector. However, the collector of the present invention is readily cleared of snow under most conditions, as will be explained later. During the hot months cover 13 protects against hail damage, and also reflects unwanted heat away from the collector by the reflective surface on the side of the reflector opposite that used during the colder months to help prolong the life of collector material and to help keep the home cooler.

Generally it is desirable to have some heat collection, even during the summer, for domestic water heating and such. Thus, if desired, the cover 13 may be designed not to cover the entire collector and to thereby leave part of it exposed for supplying the smaller heat load. Further, although the deflective cover 13 is shown as covering a garage or part of the home, obviously such reflective unit may itself be merely a wintertime carport roof or may be added above a carport roof or other. Although illustrated as hinged to the structure at 14, it is obvious that the protective reflector may be attached otherwise, or may be detachably secured to be stored away when not needed. Means to hold the cover 13 in its raised or lowered position may be provided if desired.

As to the heat collector construction illustrated in FIG. 2, such collector comprises insulation 25 and a material such as heat conductive corrugated sheet metal 27. Preferably a vapor or liquid barrier is employed at 26, and supports 28 maintain the sheet 27 spaced above barrier 26. One or more transparencies are employed, for example, a plastic transparency at 29 and a glass-like transparency 31 spaced thereabove by spacers 30.

In the modification of FIG. 2 a fluid is circulated below the corrugated sheet 27. If the fluid is air, it is preferably introduced at the bottom and brought out at the top. If the fluid to be heated is a liquid such as water, it is introduced near the top of the collector. In FIG. 4, one method for getting the liquid onto the undersides of the valleys is illustrated. A distributor manifold 43 is used to introduce a small stream of liquid into each valley. Just below the manifold a hole is placed in each valley as at 44 so that the liquid may run through the hole to the underside of the valley and will cling to the lower side of the valley as at 35 and will run down the incline. The small streams of hot water are collected in collector manifold 45 and are returned to a place of storage or use.

It is obvious that other apparatus may be used to get the liquid onto the undersides of the valleys such as by spraying the liquid thereagainst, by using an individual tube to project a small stream onto each valley or by other expedients.

Instead of using corrugated heat collecting metal as in FIG. 2, it has been found that a mesh-like material as illustrated in FIG. 3 yields good results. Such mesh may, for example, be screen wire, plastic or other material, preferably treated to make it black. A small stream of liquid to be heated is introduced at spaced intervals adjacent the upper edge of the mesh. Although ordinary screen wire is reasonably satisfactory, it has been found that the liquid sometimes ends to skew sidewise as it travels down the mesh. The mesh 40 is preferably provided at 41, 42 with means to prevent such side skewing. This preventive means may take any one of many forms. As examples, enlarged strands may be used at 41 which will tend to prevent crossover of the liquid while adding strength to the mesh if woven therein, or which will provide support for the mesh if stretced therebeneath. Or, a material with a high degree of molecular attraction for the liquid may be used at 42 so that the liquid tends to "wet" areas 42 thoroughly but does not tend to cross over the area or strand 41. Alternatively, a liquid repellent material may be at 41 so that the liquid will not readily cross thereover. Or, two or more of these expedients may be used jointly.

Liquid flowing down the mesh acts as a good heat collecting medium. However, a gas such as air may be passed through the collector whereby heat transfer to the gas is good due to the large surface contact between the mesh and gas as it flows under and over and through the mesh.

The mesh-like material may be physically separated from the insulation and a vapor-liquid barrier such as at 26 in FIG. 2 may be interposed between the insulation and the mesh. Certain advantages can be obtained by placing the mesh in contact with the vapor-liquid barrier, or in close proximity thereto, especially when the fluid to be heated is liquid. In such construction, the barrier prevents the liquid from dripping from the mesh, even if the heat collector is set at a more-or-less horizontal incline.

Examples of materials usable in such construction are; screen wire mesh, which is dark itself or is treated to make it black to absorb solar heat, whereas the barrier therebeneath may be made of material such as plastic, sheet metal, or such. If the mesh is metallic or heat conducting, it will readily transfer the heat to the liquid or gas flowing thereover or therethrough. If the mesh is not highly conductive of heat, a good rate of heat transfer the fluid will still be achieved due to the tremendous areas of contact between the fluid and the solar heated mesh. If the barrier itself is dark and heat absorbing it will tend to be heated when some of the sun rays get through the mesh and will tend to intensify the heat in the collector, and will also tend to heat any gas or liquid coming in contact therewith. On the other hand, if the barrier is reflective it will tend to "bounce" heat rays back against the mesh from beneath when the sun is substantially at right angles to the collector at which time some of the rays get through the mesh. Thus the mesh is bombarded from above by direct solar rays and is bombarded from beneath by reflected or secondary rays. Of course when the sun is many degrees past, or ahead of, a position at right angles to the collector then the strands of the mesh will intercept substantially all sun rays directly. Also, as the seasons change and the sun is higher or lower in the sky the mesh will intercept most of the rays directly when the rays do not strike the collector at right angles thereto.

The transparent material above the heat collector mesh may be in contact or substantially in contact with the mesh, or may be spaced thereabove if desired. It is apparent that the mesh material may be sandwiched between the transparency 29 and the barrier 26 and that, if the spacing is not great, the mesh will tend to spread the small streams of liquid entering the collector into a sheet of liquid of thin dimensions so as to have a maximum of exposure of the liquid to solar rays plus a maximum of exposure of the liquid to the heat collecting mesh. As FIG. 3a illustrates the blackened heat absorbing strands may take forms other than mesh-like illustrated in FIG. 3. If the strands are zig-zagged for example there will be a retardation of fluid flow through the collector, whether liquid or gas, plus more positive contact between the fluid and strands as the fluid flows a tortious path through the collector. In this modification the strands are preferably either in contact with the transparency thereabove and the barrier therebeneath, or are in close proximity thereto. As a practical manner of manufacture the strands may be secured to either the transparency, or to the barrier, or to both. Of course liquid repellent strands, or spaced enlarged strands, or liquid attracting strands may be used if desired, as taught in relation to FIG. 3. If desired, the fluid itself may be black to enhance heat collection inasmuch as much of the solar rays will be converted directly into heat within the sheet of liquid itself. Efficiency of the heat collectors described is high whether solar energy comes in by direct rays or by reflected and diffused sky radiation.

FIG. 4 illustrates a heat collector having a second distributor manifold at 46 and a second collector trough at 47. For wintertime use, water may be introduced onto the top of transparency 31 to dislodge or wash snow or ice from the collector in the event it does not skid off due to gravity. Also, trough 47 may be connected with the liquid reservoir if desired to provide makeup water from rain as needed. During the sumertime, water is circulated over the top of transparency 31 at night to give up its heat to the atmosphere due to radiation, evaporation, and cooling by the cool night air.

During the summertime the daytime temperatures inside the collector rise to a high degree, especially if apparatus such as that at 13 in FIG. 1 is not used. To permit such heat to escape more readily, damper 48 may be hinged at 49 to be opened and let the hot air out at the top. A damper may be provided at 50 to let cool air in at the bottom. Thus, overheating may be minimized or avodied by natural air circulation.

In FIG. 5 a preferred means for fastening the outer transparency 31 to spacer 30 is illustrated. Such means comprises screws 52, washers 53 and generally H-shaped gasket 54. Said gasket is not only H-shaped to secure two transparencies 31 therein, but also preferably has an upwardly projecting lip 55 to assure that no rain can get up around projection 55 even if it could get down between transparency 31 and gasket 54. The lower edge of the gasket is preferably formed somewat reversely of the upper edge with a downwardly projecting lip 55' lower than lip 54'. Thus, the same type of gasket may be used between the vertical joints of the transparencies and such may project upwardly to meet shortened lip 54' whereby rainwater will be diverted over the joint by overhanging lip 55'.

FIG. 6 illustrates a circuit for operating the pump motor for the solar heat collector and thereby controlling flow of fluid through the collector whether it be liquid or gas. Such circuit includes a photoelectric cell or "electric eye" 56 to determine whether the weather is sunny or cloudy, a time switch 57 which will cut on daily from say 8:30 to 4:00 and a temperature switch 58, which is preferably located where the heat is stored and which will cut off when the storage temperature reaches a desired level. These switches are in series. Thus, if the sun comes up on a cold morning, bright enough to actuate the electric eye, but is not yet intense enough to yield useful heating, the electric eye switch turns on but the time switch keeps the circulating pump cut off until say 8:30 when solar energy received is intense enough to be useful. At this pre-selected time the time switch will cut on and if the level of heat in the storage apparatus is low and needs to be increased, the temperature switch will be closed and the pump will operate to circulate fluid through the collector to collect solar heat. Then, suppose it becomes cloudy, the electric eye cuts the pump off and the gas or liquid heat transfer medium is no longer circulated through the collector. Suppose the sun comes back out, and stays out, the electric eye switch cuts back on and the pump operates until the time switch cuts off at say 4:00, or until the storage temperature level is as high as desired, at which time the temperature responsive switch cuts off. In any event, as soon as the collector pump is cut off the liquid in the system, if liquid is used, drains from the collector imediately and cannot freeze up and burst the collector.

During some days clouds and sunshine come intermittently and will start and stop the pump unnecessarily frequently. In such instance, a time delay device may be used to prevent immediate cut on or cut off when the "electric eye" 56 is actuated. While it is possible to substitute a reverse acting thermostatic switch for the electric eye, to turn the pump motor on when solar heat is available, and to turn it off when no heat is available, the electric eye has certain advantages.

FIG. 7 illustrates a circuit and switches preferred for operating the summertime cooling apparatus to supply liquid to distributor manifold 46. Such circuit includes a "humidostat" switch 59, a time switch 60 and a temperature responsive switch 61. Time switch 60 will turn on nightly during the hot summer from say 10:00 p.m. to 6.00 a.m. If the night is fairly dry then "humidostat" 59 will be closed and the liquid will be circulated through manifold 46, over transparency 31, to collector trough 47 and back to the "cold" storage apparatus. Cooling takes place due to evaporation and radiation as the fluid flows over transparency 31. However, if the humidity is extremely high so that evaporative cooling is only nominal, the "humidostat" 59 will prevent the apparatus from operating. Temperature responsive switch 61 may be used to sense outside temperatures so that the dissipator will not come on early during an extremely hot night when heat dissipation may be low. However, if desired, both the "humidostat" 59 and the outdoor temperature sensing switch 61 may be omitted so that the heat dissipator will operate every summer night from say 10:00 p.m. to 6:00 a.m. if the "cold" storage apparatus needs chilling. If desired, a temperature responsive switch 62 may be provided to sense the "cold" storage apparatus temperature. If this temperature is low enough, switch 62 will cut out so that the pump will not operate again until further cooling is needed.

Although specific forms of the invention are disclosed to illustrate the underlying principles, yet modifications may be made which fall within the spirit of the invention.

What I claim is:

1. A solar heat collector comprising an insulating base, a mesh-like heat collecting sheet spaced thereabove, at least one transparency above said heat collecting sheet, said collector being mountable in an inclined position to provide an upper edge and a lower edge, a distributor manifold to introduce small streams of cool liquid at spaced intervals along the upper edge of said mesh-like collecting sheet such that the liquid will flow down the inclined mesh, and a collector manifold at the lower edge of said mesh to collect the small streams of heated liquid for return to a point of storage or use, said mesh having means to minimize side skewing of the liquid as it travels down said mesh.

2. A solar heat collector comprising an insulating base, a mesh-like heat collecting sheet spaced thereabove, at least one transparency above said heat collecting sheet, said collector being mountable in an inclined position to provide an upper edge and a lower edge, a distributor manifold to introduce small streams of cool liquid at spaced intervals along the upper edge of said mesh-like collecting sheet such that the liquid will flow down the inclined mesh, and a collector manifold at the lower edge of said mesh to collect the small streams of heated liquid for return to a point of storage or use, said mesh having areas with surfaces of a high degree of molecular attraction for said liquid and areas with surfaces of a low degree of molecular attraction to secure good wetting characteristics of said mesh and to help control the flow pattern down said mesh.

3. A solar heat collector comprising an insulating base, a mesh-like heat collecting sheet spaced thereabove, at least one transparency above said heat collecting sheet, said collector being mountable in an inclined position to provide an upper edge and a lower edge, a distributor manifold to introduce small streams of cool liquid at spaced intervals along the upper edge of said mesh-like collecting sheet such that the liquid will flow down the inclined mesh, and a collector manifold at the lower edge of said mesh to collect the small streams of heated liquid for return to a point of storage or use, said mesh having spaced enlarged strands to minimize side skewing of the liquid as it flows down said mesh.

4. A solar heat collector comprising an insulating base, a mesh-like heat collecting sheet spaced thereabove, at least one transparency above said heat collecting sheet, said collector being mountable in an inclined position to provide an upper edge and a lower edge, a distributor manifold to introduce small streams of cool liquid at spaced intervals along the upper edge of said mesh-like collecting sheet such that the liquid will flow down the inclined mesh, and a collector manifold at the lower edge of said mesh to collect the small streams of heated liquid for return to a point of storage or use, said mesh having spaced strands having surfaces of a low degree of molecular attraction for said liquid to repel said liquid and to thereby aid in channeling the liquid.

5. A solar heat collector comprising an insulating base, a heat collecting sheet thereabove and at least one transparency above said sheet, said collector being mountable in an inclined position to provide an upper edge and a lower edge, said collector including means to introduce fluid in heat exchange relationship with said heat collecting sheet, said collector including outlet means for said fluid, and a protective reflective cover having reflective surfaces on both sides thereof to be placed over said collector to minimize collector damage by hail, sleet and the like and to reflect solar energy away from the collector by one of the reflective surfaces to minimize damage by unnecessary heat buildup, the opposite reflective surface of said covering being positionable to intensify solar heat input to said collector when desired, said covering being hinged adjacent the lower edge of said heat collector, forming a reflector-protector when swung up over the collector and adapted to form a roof section for a garage or the like when swung out to intensify solar heat input to the collector.

6. A heat collector-heat dissipator comprising a solar heat collector having a heat dissipator thereabove, means to bring liquid to be cooled onto the top of said collector for nighttime cooling, a circuit to control said means comprising, in series, an electrical time switch the contacts of which are closed and opened at predetermined times, a humidity controlled switch to stop said means when relative humidity of the ambient air rises to a predetermined level, a thermostatic switch subjected to ambient air temperatures and whose contacts close when the ambient air temperature is below a pre-set level, and a reverse-acting thermostat subjected to the temperature of stored liquid cooled by the heat dissipator and whose contacts close when the temperature rises above a pre-set level.

7. A heat collector-heat dissipator comprising a solar heat collector having a heat dissipator thereabove, means to bring liquid to be cooled onto the top of said collector for nighttime cooling, a circuit to control said means comprising, in series, an electrical time switch the contacts of which are closed and opened at predetermined times, and a humidity controlled switch to stop said means when relative humidity of the ambient air rises to a predetermined level.

8. A solar heat collector comprising an insulated base and a mesh-like material thereabove with a transparency above said mesh-like material, means to channel fluid to be heated flowing along said mesh-like material, means to distribute fluid to be heated to said mesh-like material, means to collect fluid heated by said mesh-like material, means above the transparency to introduce liquid onto said transparency for ice and snow removal or for heat radiation and evaporative cooling, collector means to collect liquid flowing from said transparency, damper means at the top and at the bottom of said collector to permit ventilation and escape of excess heat when such dampers are open, and a protective reflective cover to be placed over said collector to prevent damage by hail and such or by unnecessary heat buildup or to be placed in a reflective position to intensify heat on said collector when desired.

References Cited by the Examiner

UNITED STATES PATENTS

| | | | |
|---|---|---|---|
| 201,439 | 3/1878 | Moreau | 126—270 |
| 842,658 | 1/1907 | Haskell | 126—271 |
| 965,391 | 7/1910 | Little | 237—1 |
| 1,093,925 | 4/1914 | Foresman | 126—271 |
| 1,130,870 | 3/1915 | Willsie | 126—271 X |
| 1,240,890 | 9/1917 | Shuman et al. | 126—271 |
| 1,808,058 | 6/1931 | Morrison | 20—56.4 X |
| 1,989,999 | 2/1935 | Niederle | 126—271 |
| 2,104,088 | 1/1938 | Lyman | 257—274 |
| 2,110,693 | 3/1938 | Bailey | 257—274 |
| 2,213,894 | 9/1940 | Barry | 126—271 |
| 2,232,347 | 2/1941 | Stuart | 257—180 |
| 2,238,924 | 4/1941 | Bennett | 257—180 |
| 2,342,211 | 2/1944 | Newton | 126—271 X |
| 2,358,476 | 9/1944 | Routh et al. | 126—271 |
| 2,396,338 | 3/1946 | Newton | 237—1 |
| 2,529,621 | 11/1950 | Mayo | 237—1 |
| 2,545,054 | 3/1951 | Stitz | 236—46 |
| 2,660,863 | 12/1953 | Gerhart | 126—271 X |
| 2,969,918 | 1/1961 | Phelps | 126—270 X |
| 2,975,446 | 2/1961 | White | 236—46 |
| 2,998,005 | 8/1961 | Johnston | 126—270 |
| 3,025,851 | 3/1962 | Steinberg | 126—270 |

FOREIGN PATENTS

| | | |
|---|---|---|
| 909,092 | 11/1945 | France. |
| 1,062,948 | 12/1953 | France. |
| 23,624 | of 1911 | Great Britain. |
| 547,467 | 8/1942 | Great Britain. |
| 817,995 | 8/1959 | Great Britain. |

JAMES W. WESTHAVER, *Primary Examiner.*

PERCY L. PATRICK, CHARLES SUKALO, *Examiners.*

C. J. MYHRE, E. M. OLSTEIN, *Assistant Examiners.*